United States Patent [19]

Nelson

[11] 4,356,613
[45] Nov. 2, 1982

[54] KEY TOP FOR AUTOMATIC ASSEMBLY FOR KEYBOARD APPARATUS

[75] Inventor: Edward I. Nelson, Sunrise, Fla.

[73] Assignee: Burroughs Corporation, Orlando, Fla.

[21] Appl. No.: 254,519

[22] Filed: Apr. 15, 1981

[51] Int. Cl.³ .................... B23Q 15/013; B23Q 17/00
[52] U.S. Cl. ........................................ 29/407; 29/809;
                                              209/583; 400/490
[58] Field of Search ................. 29/407, 809, 822;
                                              209/583; 400/472, 490

[56] References Cited

U.S. PATENT DOCUMENTS

| | | | |
|---|---|---|---|
| 3,081,885 | 3/1963 | Carlzen | 29/809 |
| 3,523,316 | 8/1970 | Alexander | 29/809 |
| 3,851,359 | 12/1974 | Escholz | 29/809 |
| 4,042,090 | 8/1977 | Hasebe et al. | 400/490 |
| 4,058,217 | 11/1977 | Vaughn et al. | 209/583 |
| 4,182,030 | 1/1980 | Mullins | 29/809 |
| 4,248,389 | 2/1981 | Thompson et al. | 209/583 |

OTHER PUBLICATIONS

Manufacturing Engineering, vol. 85, No. 1, Jul. 1980, p. 56.

Primary Examiner—Ervin M. Combs
Assistant Examiner—Steven Nichols
Attorney, Agent, or Firm—Carl Fissell, Jr.; Kevin R. Peterson

[57] ABSTRACT

A method of forming and attaching individual key tops to the key stems of a multi-key keyboard wherein each key top is formed of contrasting colors such that the key top indicia is clearly visually recognizable while also providing each key top with a bar code indicia for enabling a bar code reader to select a desired key top from among a random group of key tops and for enabling a transfer mechanism to selectably orient the selected key top with respect to a key stem for automatic attachment thereto.

10 Claims, 11 Drawing Figures

KEY TOP FOR AUTOMATIC ASSEMBLY FOR KEYBOARD APPARATUS

BACKGROUND OF THE INVENTION

1. Field of the Invention

This invention relates to a keyboard apparatus and to the identifying symbology used with key tops whereby automatic key top insertion is enabled through the utilization of contrasting colors and automatic reading of bar code indicia signifying the specific alphanumeric symbology for this specific key top.

2. Description of the Prior Art

In keyboard production generally, the key tops are manually assembled to the keys using visual orientation and relatively large numbers of operators to produce the complete keyboard. As production volumes increase, the cost of this very simple operation becomes prohibitive. Since an operator required a large work orientation for placing the key tops on keys whereas as many as 120 keys are involved, the opportunity for error that a key will be placed in the wrong location increases exponentially.

Two basic requirements immediately present themselves.

1. Uniformly orienting the key tops so that an operator knows or can quickly determine which side, top, bottom or edge is to be handled first, etc., for placement upon the key stem with which the key top is to be associated.
2. Identifying the key top so that the operator places an A where it belongs and a B where it belongs etc., without the accidential mixup of key tops relative to the specific key stems.

Presently these operations as performed by hand, are time consuming and very prone to error. Solving the first problem can be accomplished by means, of a character code to interpret the letter, symbol, number or indicia on the key top. However, because of the differences in characters, differences in languages, symbols, indicia, and etc., this is not the most practical method of reading the letter or symbol since different key tops often have the same letter but in different formats or synbology or are located in different places depending on keyboard layouts.

SUMMARY OF THE INVENTION

The present invention solves these and other associated problems in a new, novel and heretofore unobvious manner by providing a method, article of manufacture and apparatus for automating the insertion of key tops to key stems for keyboard production.

In accordance with the present invention each key top is molded of two very highly contrasting colors e.g. white and blue or red and black or black and very light grey. Etched or formed into the underneath surface of each key top is an individual bar code similar to the present Universal Product Code in use in grocery chains for indicating the price and/or number indicia of the product being offered for sale. Each bar code being unique gives a unique identification to each letter, number or symbol to be interpreted. The bottom edge on one side of each key top is extended to provide a slight curved skirt projecting approximately fifteen thousandths of an inch effectively identifying the "upright" readable character orientation of the specific key top. A vibratory bowl for use with the random group of key tops is provided with a located groove around its under periphery into which the key top arcuate skirt is receivable, effectively oriented each key top in the upright visible position for apparatus to apply the key top to the operably associated key stem with which ultimately will be utilized. A bar code reader is programmed to read each key top bar code after which the key top is selectively passed into one of a series of bins or chutes oriented over the keyboard containing the vertically disposed key stems awaiting reception of the key tops. With the bar code information stored in memory and with an x-y table holding the keyboard as the insertion machine receives the position indication from the memory of the reader the key top is automatically pressed upon the designation key stem and this process is continued until the keyboard is populated with the desired number of alphanumeric indicia keys.

Other advantages of the present invention will be readily appreciated as the same becomes better understood by reference to the following detailed description when considered in connection with the accompanying drawings.

BRIEF DESCRIPTION OF THE DRAWINGS

FIG. 6 includes the view of the x-y table used with the apparatus of the present invention;

DETAILED DESCRIPTION OF A SPECIFIC EMBODIMENT

Figure 1:
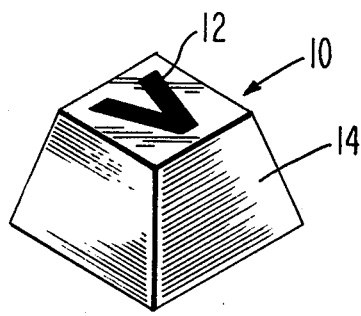
FIG. 1 is an isometric view, not to scale, of a typical key top with the letter "v" in contrasting colors thereon.
Figure 2:
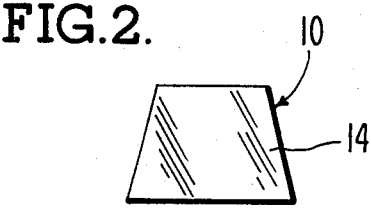
FIG. 2 is a side elevational view of the key top of FIG. 1.

As seen in FIGS. 1 and 2 the prior art key top in present use has a predesigned physical shape, (FIG. 1). This is a truncated, four sided pyramid 10 of two tone plastic, in this case black over white. The letter "v" 12 being black while the key top body 14 is white. Essentially two basic aspects are changed by the present invention over prior art key top construction. These are:

1. The means for getting the keys uniformly oriented, and
2. Identifying which key is which from among all the alphanumeric keys being used.

Figure 3:
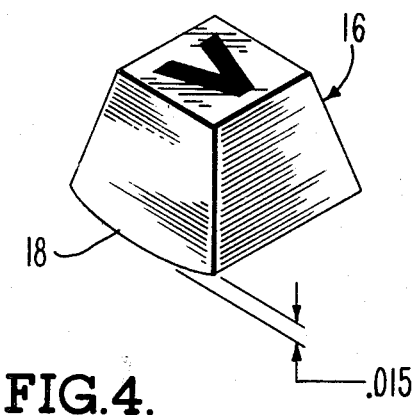
FIG. 3 is a three quarter top side view of the key top of the present invention illustrating the arcuate skirt or rim formation of one side edge of the key top.
Figure 4:
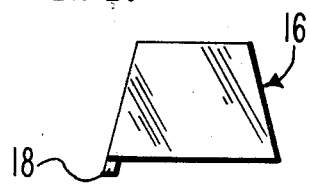
FIG. 4 is a side elevational view of the key top of FIG. 3 more clearly illustrating the skirt formation of the device of FIG. 3.

To accomplish the first aspect as seen in FIG. 3, the bottom edge of key 16 is provided with a skirt 18 producing a downwardly, arcuately projecting edge, lip or rim. In contrast to this the "prior art key" illustrated in side elevational view in FIGS. 1 and 2 shows a totally flat bottom edge. In FIG. 3 the extended arc of the curve i.e. its projected view, has a small amount of material on the order of fifteen thousandths of an inch projecting downwardly. The purpose of the projection 18 is so that when these parts are placed in vibratory feed bowl 20 having a guide groove 22 cut into the track of the bowl, projection 18 will be obliged to drop into the groove 22 and to be retained therein in the bowl so as to be properly oriented as the part is vibrated around the circumference of the feeder bowl 20. The other orientations of the key top would be upside down or rotated incorrectly. Thus, since there is nothing to retain the key top it would be dropped back into the bowl to be recirculated. With the technique all of the parts coming out of the bowl that are guided by the track or groove section 22 would all be physically, correctly oriented in one direction.

The skirt curve 18 is so slight that the eye of the operator probably would not be able to detect it and the only way it would be observed would be if the key top was laid on a flat surface the fact that the key top would rock slightly indicating the slight curvature thereof. But, mounted on a key stem, since it is up on a post, chances are that the human eye would not be able to detect that small amount of curvature. The fifteen thousandths extension set forth above would be sufficient mechanically to hold the part on the track 22, in the vibrating bowl assembly and thus would present no significant problems for orientating the key tops for further handling.

Figure 5:
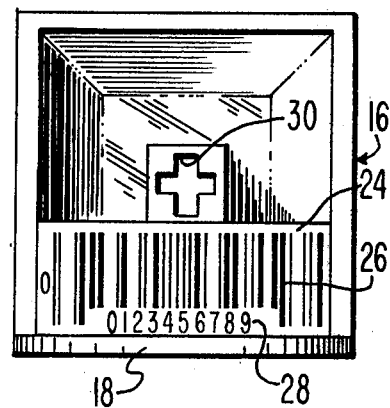
FIG. 5 is a bottom plan view of the underneath side of a representative key top of FIG. 3 illustrating the bar code contrasting colors of material for use with the key tops.

In general practice the keys are usually molded of two highly contrasting colors, which are black and white or white and red or black and light grey but always highly contrasting. Thus each key top whatever the engraving or lettering on the key top happens to be, requires a special mold or tooling to achieve a specific key indicia. If a thousand letters or combinations of letters and words were to be employed it would be necessary to have a thousand sets of tools to achieve the individual items. The present invention discloses, as seen in FIG. 5 that the inside or underneath surface 24 of key 16 is provided with a bar code similar to the Universal Product Code including a series of bars 26 and/or numerals 28 if required.

Each of the codes is unique for the specific alphanumeric or symbological indicia being utilized therewith. The illustrated key top has a mounting 30 in the form of a plus sign 30 in the form of a "+" formed into its inside top, for mounting the key top as hereinafter described.

Each bar code representation is molded into the underside of the key top by part of the tooling that generates the lettering or numbering which produce the light and dark contrasting colors. With the keys oriented by the vibratory feeder a commercial bar code reader 32 can, with a prearranged code ascribed to each of the letters, look into the key top and ascertain what its top surface characteristic is i.e. what letter, number, symbol and etc. is involved.

Figure 6:
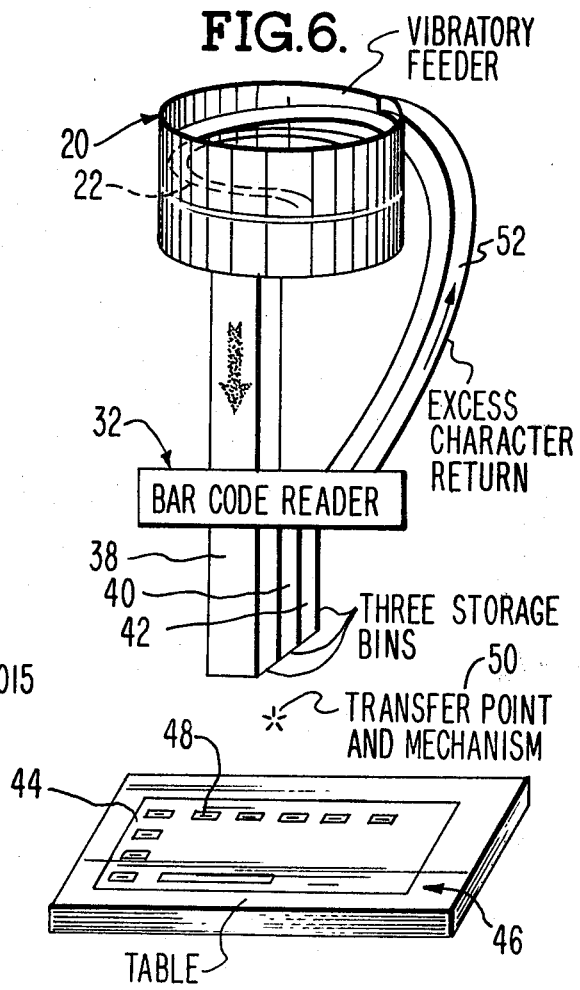
FIG. 6 is a schematic illustration, not to scale, of a vibratory bowl feeder for use with the present invention.
Figure 7:
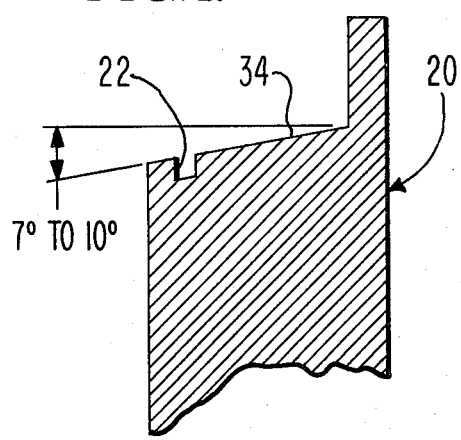
FIG. 7 is a partial side elevational view of the vibratory bowl feeder of FIG. 6 illustrating the guidance track for the key top.
Figure 8:
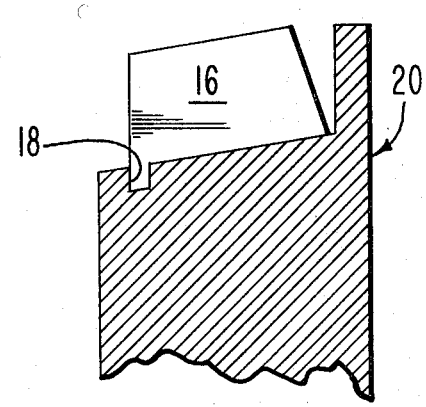
FIG. 8 is a view similar to FIG. 7 showing a key top properly located in the guide track.
Figure 9:
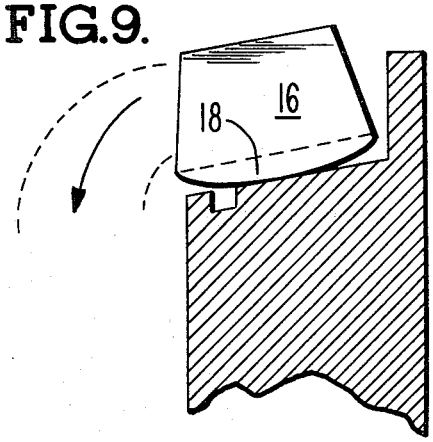
FIG. 9 is a view similar to FIG. 7 illustrating the case wherein a key top is misoriented with respect to the guidance groove.

As seen in FIG. 6 there is disclosed a schematic representation of an assembly machine to utilize this information. The machine works in the following way. The key tops or sets of key tops 16 may be placed randomly in bowl 20. This could be mixed sets as the key tops come out of the molding machine fifty or a hundred of each kind, where required. Buckets of each kind could then be put into the vibratory bowl 20. The vibratory bowl feeds the key tops 16 out in a random fashion. However, with the predescribed orientation feature (FIGS. 7-9). The key tops would all be facing one way with the character side surface "up" and the letter indicia oriented as it would normally be read.

As seen in the partial sectional side elevational view of FIG. 7 feedbowl 20 has its inner top surface 34 canted or angled slightly at approximately 7° to 10° from the horizontal. The guide track, groove or notch 22 is cut along the outer edge portion as shown. With a key top 16 having its skirt or projection 18 properly oriented in groove 22 the key top is held on the sloped track for proper feeding. However, should the key top 16 be misoriented as shown in FIG. 9 the key top would fall off the angled surface 34 in the direction of arrow 36 and be recirculated by the bowl 20. The properly oriented key top 16 as in FIG. 8 would then pass to the bar code reader 32. The bar code reader 32 determines which key is which and allows the key to go into one of three bins or chutes 38, 40 or 44 while simultaneously recording in an electronic memory associated therewith but not shown herein in what sequence the key tops are disposed in the three chutes.

Keyboard 44, to be filled with suitably ordered key tops 16, is located on an x-y table 46 with the key stems 48 projecting vertically upwardly awaiting respective key tops. The bar code reader 32 is then enabled so as to lookup in its memory the identity of the first key top 16 in a sequence. This information is used to determine where the first or next key top belongs and the appropriate x-y table movement generated to position the key stem into the proper position to receive the corresponding key top. This key top is deposited onto the identified key stem 48 of keyboard 44, as required.

OPERATION

Assume that unloading takes place from the first storage bin 38. The keyboard 44 is locked on the x-y table 46. The bar code reader 32 looks up in its memory the identity of the first key in bin 38. As in general inventory control it is "first in and first out". The transfer mechanism 50 places the key top 16 in the correct position with its orienting recess 30 down onto the key stem 48 on the x-y table. The bar code reader 32 then looks up the second key top location, whatever it happened to be at random, and places that key top on the key stem on the keyboard 44 in that sequence as the key tops come out of the bowl 20 at random.

With respect to the second and third bins 40 and 42, suppose that the letter "a" comes in and it is put into the first storage bin 38 and then ten key tops later another letter "a" appears. It could be placed back into the bowl since it is not needed. However, instead of putting it back and having the key tops just keep recirculating it is put into the second storage bin 40 and the memory of the bar code reader is reset for that sequence. Thus while the first bin 38 is being emptied the second bin 40 is being filled. If a third letter "a" shows up it would be placed in the third bin 42. If a fourth letter "a" shows up it would be kicked back into the bowl 20 via excess character return track 52 for recirculation. Thus, this method saves time in recirculating the key tops since if there were for example 50 letters, the probability of any one of them being the required one is one in fifty but the key tops will still be presented in some kind of a mix. The present method will improve the efficiency of the machine by not having to wait until all key stems are filled up.

Figure 11:
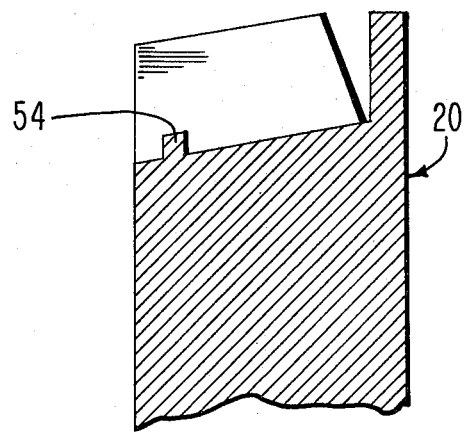
FIG. 11 is a view similar to FIG. 7 but illustrating the alternate guide track (raised ridge) for the key top of FIG. 10.
Figure 10:
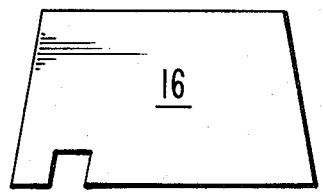
FIG. 10 is a view (not to scale) of an alternate guide means for the key top of the present invention.

An alternate key top orienting means is illustrated in FIGS. 10 and 11. Here key top 16 is provided with a slight notch or groove 54. The vibratory bowl 20 shown in partial cross section in FIG. 11 is provided with a vertical, upstanding ridge or projection 56 which as seen mates with and engages the groove 54 accurately guiding the key top 16 to its intended destination. Misorientation of the key top as in FIG. 9 causes the key top to fall down the inclined surface 34 and be recirculated as before.

One of the key elements in terms of making this mechanism work efficiently is that it would not require all key tops to be placed on all key stems before the keyboard would be considered to be completed. The filling action would be stopped or the searching for the key top would be stopped three to five key tops short of a full keyboard. This results from the fact that although the key tops come out in a random manner a particular key may not show up in the 150 or 300 keys that may go through the system and the keyboard would be filled up with everything else but these few key tops. Therefore, it would be time wasteful and costly for the machine to continuously keep searching for key tops. An operator can easily replace a few or even one or two missing keys. Thus, by this method the machine would not be tied up waiting so as to reduce its throughput. Since there is an operator attending it anyway, loading empty keyboards onto the x-y table 46 and taking away the full keyboards, it would be more efficient to fully utilize the operator by having him or her replace the very few missing keys by hand. An additional reason for stopping the machine when the keyboard is a few short of the required key tops it is supposed to have, is that when the particular key that is desired is not available due to the mold tooling not being operational (for example) it is not necessary to stop the entire line for the one missing key. If it was required that the full program be completed and that all the keys be on the keyboard before it was considered complete the machine theoretically would never complete the keyboard because there might always be a key missing. The present operation still allows the assembly of the keyboards even with missing keys and the keyboard could be substantially completed which would be considered sufficient. The full complement of key tops would be made up later on.

The irregular key tops or a space bar could be put on in a secondary operation.

What is claimed is:

1. A method of automatically attaching indicia coded key tops to the key stems of alphanumeric keys comprising;
   a. Forming a key top in contrasting colors such that the indicia color differs from the surrounding color,
   b. Providing orienting and guiding means for each key top,
   c. Applying coded indicia to said key top indicating the information/data carried by said key tops,
   d. Providing feeding means for said key tops including means for receiving said key tops in random order and for orienting said key tops rightside up for serial feeding,
   e. Providing one or more correctly oriented key stems in position for receiving respective key tops,
   f. Selectively matching an individual key top with a respective key stem,
   g. Transferring a selected key top from said feeding means to a respective key stem in accordance with the selective matching step, and
   h. Returning unwanted key tops to said feeding means for further handling.

2. The method of claim 1 wherein step (a) comprises molding each key top so that the color of the main body of said key top differs from that of the indicia.

3. The method of claim 1 wherein step (a) further comprises the step of forming said indicia at differing elevations relative to the surrounding area of said key top.

4. The method of claim 1 wherein step (b) comprises forming an extension relative to one edge of said key top.

5. The method of claim 1 wherein said forming step comprises molding said extension.

6. The method of claim 1 wherein said molding step further comprises forming a well defined but slight radius along said one edge of said key top.

7. The method of claim 1 wherein step (c) further comprises providing both alphanumeric indicia as well as a bar code of alternate heavy and light spaced bars or lines.

8. The method of claim 1 wherein step (c) is carried out by the further step of alternately raising and indenting the area of said key top carrying the coded indicia.

9. The method of claim 1 wherein step (d) further includes providing guiding means in said feeding means for receiving the guiding means of said key tops.

10. The method of claim 1 wherein step (e) further includes orienting a multi-key keyboard on an x-y table and coupling said table to said feeding means effective to transfer a key top to a key stem as selected.

* * * * *